United States Patent [19]
Germond et al.

[11] 3,790,002
[45] Feb. 5, 1974

[54] MANIPULATOR WITH DRIVE MOTORS

[75] Inventors: Jean-Claude Germond, Paris; Charles Glachet, Vendome; Jean-Pierre Guilbaud, Jou Ars-Pontchartrain; Jean Vertut, Issy-Les-Moulineaux, all of France

[73] Assignee: Commissariat A L'Energie Atomique, Paris, France

[22] Filed: Oct. 10, 1972

[21] Appl. No.: 296,054

[30] Foreign Application Priority Data
Oct. 11, 1971 France .............................. 7136470
May 10, 1972 France .............................. 7216859

[52] U.S. Cl. ........................... 214/1 CM, 214/1 CM
[51] Int. Cl. ................................................ B25j 3/00
[58] Field of Search ............................... 214/1 CM

[56] References Cited
UNITED STATES PATENTS
3,314,552  4/1967  Vertut ............................. 214/1 CM
3,481,493  12/1969  Walischmiller ................. 214/1 CM Primary Examiner—Gerald M. Forlenza
Assistant Examiner—George F. Abraham

[57] ABSTRACT

The manipulator arm is pivoted at its mid-point on a laterally displaced shoulder pin coupled to a rotatable body which has a horizontal axis on one side of said arm and serves to rotate the complete manipulator assembly about said axis.

A drive-motor block which produces a continuous balancing action about the shoulder-pin axis is pivotally mounted on one end of the manipulator arm in laterally displaced relation thereto. A wide range of angular motion is thus imparted by cable-type transmission means to a fore-arm which is rotated about an elbow pin or in azimuth and to a tong unit which is subjected to movements of elevation, rotation and closure.

13 Claims, 9 Drawing Figures

MANIPULATOR WITH DRIVE MOTORS

This invention relates to a remote manipulator which comprises in the same manner as most devices of this type an arm pivoted about a shoulder pin, a fore-arm pivoted on an elbow pin provided at the extremity of the arm and tongs pivoted on a wrist pin which is mounted at the extremity of the fore-arm, all the movements of the device being intended to correspond not only to angular movements of the above-mentioned components about their pivotal axes but also to other movements and in particular a movement of rotation of the tong unit, fore-arm and arm about their own axes at right angles to the pivotal axes and finally to closure of the tongs, these movements being carried out from electric motors or the like which are carried by the manipulator itself.

As is already known, there are different types of articulated manipulators based on the same principles, including the telescopic versions. Among these can be mentioned in particular the remotely operated power manipulators which are usually carried by an overhead traveling bridge or any like machine and actuated from non-reversible reduction-gear units which are remote-controlled by a system of the keyboard or pivoting lever type. Lighter manipulators are also known which comprise a master assembly and a slave assembly of identical design, the slave assembly being intended to permit accurate reproduction of the movements imparted to the master assembly by an operator who is stationed outside the zone of action of the slave assembly. The motors which drive the master assembly are coupled with similar motors of the slave assembly by means of a control loop which ensures synchronism of movements. The connections between the two assemblies call only for electric cables or radio transmission means which permit total separation of said two assemblies. In these designs, all the motors and associated reduction-gear units are arranged within the interior of the articulated elements of the manipulator or may alternatively be grouped together within a stationary unit which carries the arm, the fore-arm and the tongs, this unit being usually of substantial volume and weight. Moreover, in these design solutions, the need to subject the different articulated elements of the manipulator to independent movements of angular displacement by making use of motors carried by a stationary unit limits the angular range of these movements by reason of the torsion which is set up by these movements within the transmission elements between said motors and the corresponding portions of the manipulator.

The present invention relates to a manipulator of the second type mentioned in the foregoing and removes the disadvantages attached to this latter while also making it possible to obtain continuous balancing of said manipulator about its different axes of rotation by means of blocks which perform other functions at the same time within the manipulator itself.

To this end, the manipulator under consideration comprises an arm pivotally mounted on a shoulder pin and provided at one end with a yoke for the pivotal attachment to an elbow pin parallel to said shoulder pin of a fore-arm which is capable of carrying out independently of its movement about the elbow pin a movement in azimuth corresponding to a rotation of said fore-arm about its own axis and a tong unit pivoted at the extremity of the fore-arm on a wrist pin located in a plane which is parallel to the elbow pin, said tong unit being capable of carrying out independently of its movement of elevation about its wrist pin a movement of rotation about its own axis and a movement of closure of its jaws. The manipulator essentially comprises a supporting block for drive motors and reduction-gear units, said block being pivoted about a pin in parallel relation to the shoulder-pin axis at that extremity of the arm which is remote from the elbow pin so as to produce by means of transmission elements such as cables, belts or chains guided by pulleys mounted on the pivot-pins of the shoulder, elbow and wrist the movements of rotation of the fore-arm about its own axis and movements of elevation, of rotation and of closure of the tong unit, said supporting block which is rotated about its pin on the extremity of the arm with a movement in the opposite direction but having the same amplitude as the movement of the fore-arm about the elbow pin at the other extremity of said arm being so arranged as to ensure continuous balancing of the arm, fore-arm and tong unit about the shoulder pin.

In accordance with a particular feature of the manipulator considered, the movement of the arm about the shoulder pin is effected by a motor which is carried by the arm and the output shaft of which comprises a pinion disposed in meshing engagement with a ring-gear which is rigidly fixed to the body and coaxial with the shoulder pin. Accordingly to yet another characteristic feature, the movement of the fore-arm about the elbow pin and the parallel movement of the supporting block in the opposite direction and having the same amplitude are carried out by another motor which causes the rotation about the shoulder pin of at least one drive pulley on which is fixed a cable or chain passed over a pulley having the same diameter attached to the fore-arm at the elbow-pin axis and over another pulley also having the same diameter and attached to the supporting block at the axis of articulation of said block on the arm. Preferably, the drive pulley is separated into two parallel pulleys for driving two cables or chains which pass in one case over the pulley of the elbow pin and in the other case over the pulley of the supporting-block pin.

In accordance with a further characteristic feature of the manipulator according to the invention, the transmission elements of the type consisting of cables, belts or chains which are driven by the motors carried by the supporting block are associated with stress detectors mounted on an extension of the arm and adapted to check the torques transmitted during the different movements. As an advantageous feature, said stress detectors measure in the case of each movement the difference between the forces exerted on two oppositely acting transmission elements which pass over the guide pulleys of the elbow pin and of the supporting-block pin.

In one embodiment of the manipulator, the shoulder pin is carried by a body mounted so as to be capable of moving about a horizontal axis which is adjacent to the arm and about which is performed the general movement of rotation of the arm, fore-arm and tong unit, the movement of rotation of the body about said horizontal axis being effected by a motor mounted on a column which supports said body.

In another embodiment, the axis of the shoulder pin is disposed along a diameter of a cylindrical sleeve mounted so as to be capable of rotating about its own axis within a support, the axis of the sleeve being perpendicular to the axis of the shoulder pin and in intersecting relation thereto.

In the case just mentioned, the cylindrical sleeve can be secured externally to a guide pulley by means of a driving element such as a cable, belt or chain, said element being passed over a second pulley of which the axle-pin is driven by a reduction-gear motor so as to initiate rotation of the sleeve and the complete manipulator about the axis of said sleeve within the support. Advantageously and in the same embodiment, the cylindrical sleeve is provided with extensions on which are mounted two additional reduction-gear drive motors, one motor being intended to drive a pinion attached to the arm and having an axis which coincides with the shoulder-pin axis and the other motor being intended to drive a second pinion mounted to rotate freely about the shoulder pin and attached to an idler pulley loosely mounted on said pin, an element for motion-transmission by cable, belt or chain being mounted between the idler pulley and a driving pulley fixed on the fore-arm and having an axis which coincides with the shoulder-pin axis.

In another alternative arrangement of the fore-going embodiment, there is obtained better balancing of the arm and a reduction in inertia of the manipulator in the transverse direction by adopting an arrangement in which a differential system controls both the movement of rotation of the complete manipulator about the axis of the sleeve and the movement of the arm about the shoulder pin without modifying the arrangement of means for controlling the movement of the fore-arm about the elbow pin. To this end, the support of the cylindrical sleeve comprises two identical reduction-gear motors having control actions which are synchronized in the same direction or in opposite directions and transmit power separately to two driving pulleys, each driving pulley being associated with a guide pulley in coaxial relation with the sleeve and freely rotatable on said sleeve, then with two return pulleys freely mounted on pins carried by yokes which are fixed on said sleeve, and finally with a driven pulley attached to the arm and having an axis which coincides with the shoulder axis, the two driven pulleys corresponding to the two reduction-gear drive motors being identical and in coaxial and rigidly fixed relations.

Further characteristic features of a manipulator with drive motors as constructed in accordance with the invention will become apparent from the following description of a number of exemplified embodiments which are given by way of indication and not in any limiting sense, reference being made to the accompanying drawings, in which.

Figure 1:
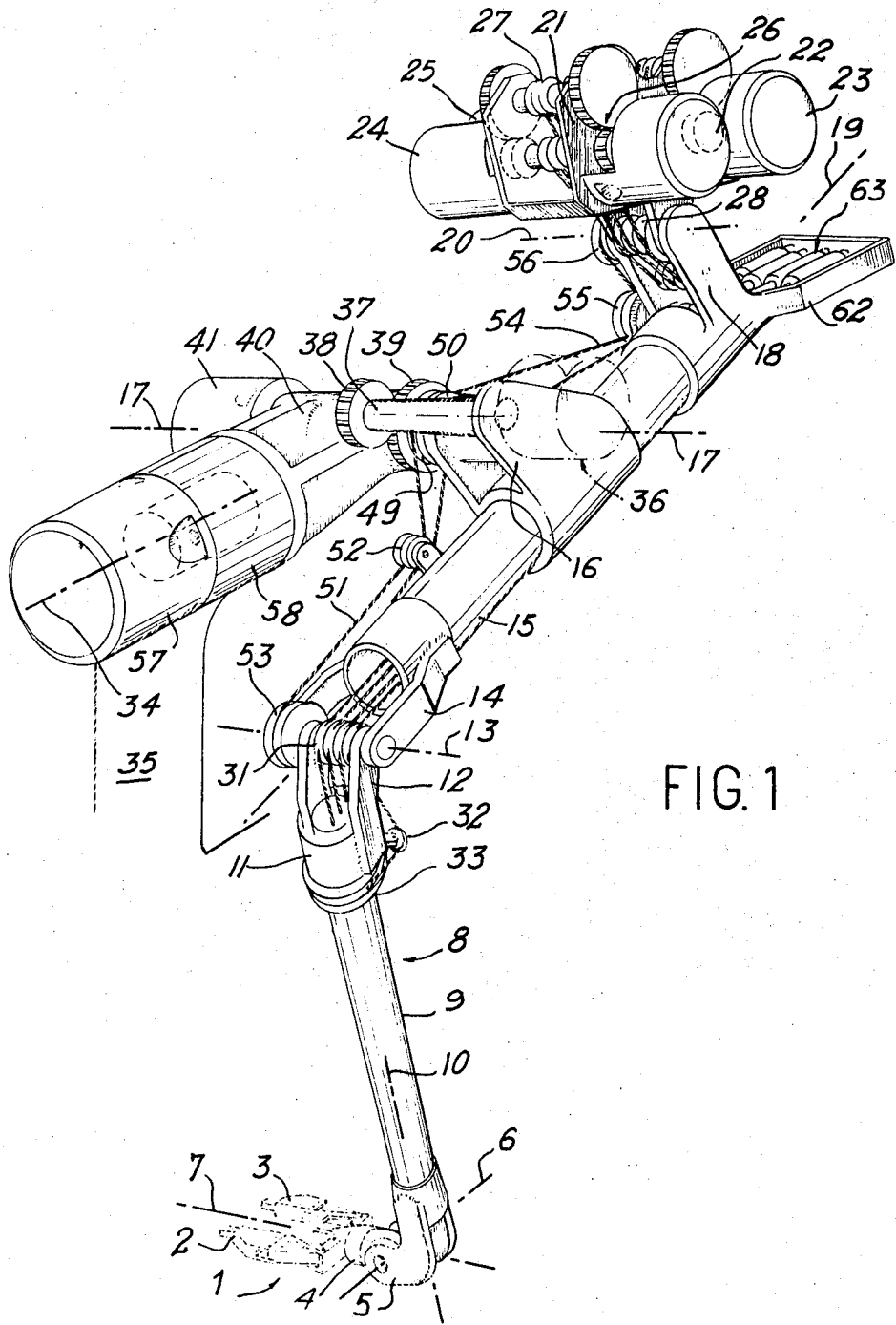
FIG. 1 is a perspective view of the manipulator considered in a first alternative embodiment, which illustrates in particular the complete assembly of mechanisms for controlling its different movements.

FIG. 1 is a general view of the manipulator under consideration and of the different control mechanisms thereof in a first alternative embodiment. The manipulator is provided in particular at one extremity with a grappling tong unit 1 comprising two clamping jaws 2 and 3, said tong unit being fixed on a yoke 4 which is coupled to a knuckle-joint 5 about a pivot-pin 6 or wrist pin, said yoke 4 being in turn adapted to permit rotation of the tong unit about its own axis as designated in the figure by the reference 7. The knuckle-joint 5 which supports the yoke 4 of the tong unit 1 is mounted at the extremity of a fore-arm 8 comprising a tubular portion 9 having an axis 10, said tubular portion being rotatably mounted in a cylindrical end-piece 11 provided at the opposite extremity of the fore-arm. Said end-piece 11 is fitted with a yoke 12 which is pivoted about a so-called elbow pin having an axis 13 to a similar yoke 14 provided at the extremity of a tubular element 15 which constitutes the arm proper of the manipulator. Said arm 15 is provided substantially at the mid-point thereof with a support stirrup 16 on which said arm and the other portions of the manipulator which are coupled thereto are mounted for pivotal motion about a so-called shoulder pin having an axis 17; the rotation of the arm 15 as a whole about said axis can be carried out by means which will be described hereinafter.

At the end opposite to the elbow pin or axis 13, the arm 15 is provided with a yoke 18 which is displaced laterally with respect to the longitudinal axis 19 of said arm, there being mounted on said yoke a pin 20 having an axis parallel to the elbow axis 13 and to the shoulder axis 17, these three axes being permanently located in the same plane. A supporting block 21 is in turn pivotally mounted on said pin 20 for supporting an assembly consisting of four motors which may be either electric or of other types, particularly hydraulic motors, penumatic motors and the like, and are designated respectively by the reference numerals 22, 23, 24 and 25. Said motors serve to carry out different movements within the manipulator, especially for the tong unit and the fore-arm.

Each motor aforesaid such as the motor 22, for example, is associated with a reduction-gear unit 26 which drives a pulley 27 on an axis parallel to the pivotal axis 20 of the supporting block 21. A motion-transmission element of the cable, belt or chain type passes within the groove of said pulley and the two oppositely acting lengths of said element ensure that the corresponding movement is carried out either in one direction or in the other. The complete assembly of transmission elements of the four motors 22 to 25 then passes over a common pulley 28 which is carried by the pin 20, then over two further pulleys 29 and 30 which are mounted within the arm 15 (see FIG. 3) before being returned in parallel relation to each other towards another pulley 31 which is mounted on the elbow pin 13. Three of the transmission elements aforesaid are then guided within the fore-arm 8 towards the tong unit 1 whilst the two lengths of the fourth transmission element are first passed over a guide pulley 32 and then attached to a transverse pulley 33 rigidly fixed to the tubular portion 9 of said fore-arm in order to carry out the rotation of this latter in azimuth about the axis 10. The three other transmission elements have the intended function of carrying out in a conventional manner the movements of elevation and rotation of the tong unit 1 about the axes 6 and 7 respectively as well as the movement of closure of the jaws 2 and 3 of sai tong unit.

Apart from the four movements mentioned above, the manipulator makes it possible by means of additional motors and especially electric motors to carry out three complementary movements corresponding respectively to a movement of the fore-arm 8 about its elbow axis 13, to a movement of rotation of the complete arm 15 and of the elements suported by this latter about the shoulder axis 17 and finally to a movement of rotation of the axis 17 itself about a second axis 34 carried by a column 35 which supports the entire device, said axis 34 being displaced laterally with respect to the arm 15 in the example under consideration.

Figure 2:
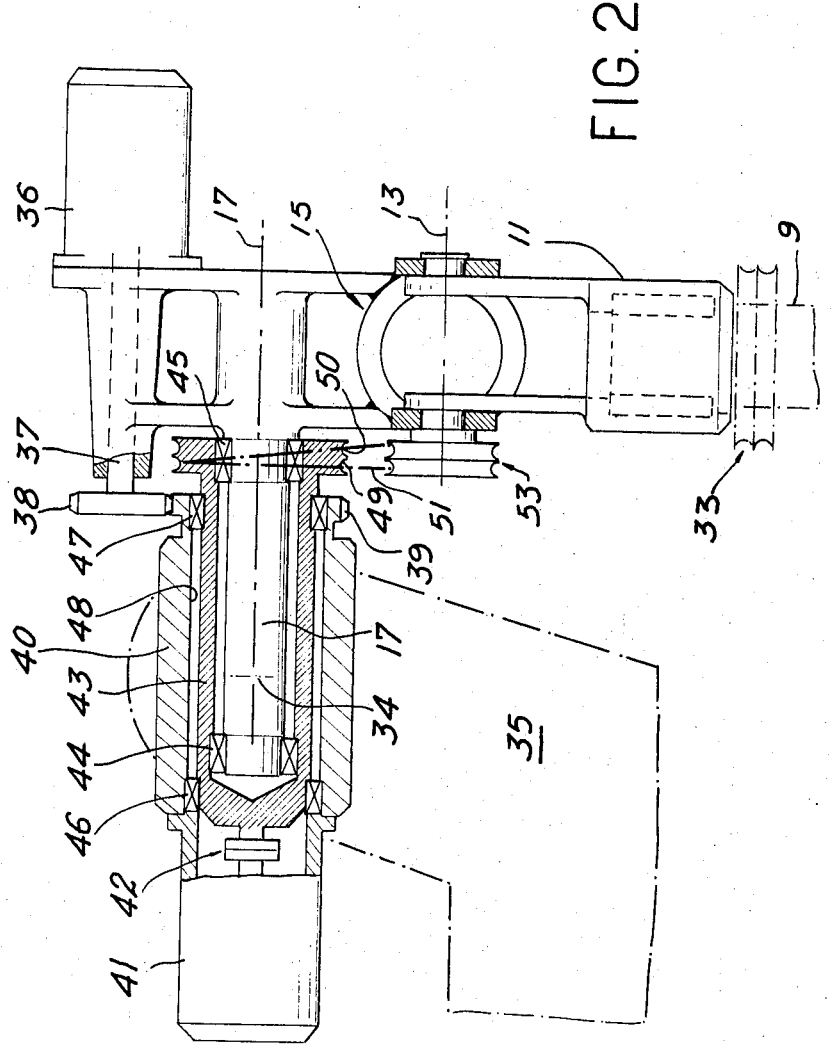
FIG. 2 is a side view of the arm of the manipulator of FIG. 1 and of the body which supports said arm as well as the drive elements which serve to carry out on the one hand a movement of rotation of the arm about the shoulder pin and on the other hand the parallel movements of the fore-arm and of the supporting block.

As shown in FIG. 2, the first movement mentioned above is performed by means of a motor 36 having a shaft 37 which is parallel to the axis 17 and terminates in a pinion 38 disposed in meshing engagement with a ring-gear 39 rigidly fixed to a body 40 which is carried by the column 35 and the axis of which coincides with the axis 34 already mentioned. The motor 36 which is carried by the stirrup 16 of the arm 15 drives the pinion 38 in rotation and this latter in turn causes the arm 15 to rotate about the shoulder axis 17 in an unlimited movement which can extend over 360° or more. The second movement, namely the movement of elevation of the fore-arm 8 about its elbow axis 13 is carried out independently of the preceding movement of the arm 15 about the axis 17, in consequence, said second movement is accompanied by a corresponding movement of the supporting block 21 which carries the motors 22 to 25, with equal amplitude but in an opposite direction. The weight of said motors, of the reduction-gear units associated therewith and of the block 21 itself have the continuous function of balancing about the shoulder axis 17 the assembly which is formed by the arm 15, the fore-arm 8 and the tong unit 1 which are pivotally coupled to each other.

To this end, the shoulder pin 17 is in turn coupled to an electric motor 41 which is carried by the body 40. The motor shaft is connected by means of a clutch-type coupling 42 to a sleeve 43 which is pivotally mounted on the one hand on bearings 44 and 45 on the shoulder pin 17 and, on the other hand, on bearings 46 and 47 on the internal surface of a recess 48 which is formed coaxially with the body 40 (as shown in FIG. 2). Said sleeve 43 supports two parallel pulleys having the same diameter, namely the pulleys 49 and 50 respectively which are joined together and keyed on said pin 17. A control element such as a cable or chain 51 is mounted on the pulley 49 and guided by a return pulley 52 which is attached to the arm 15 towards a pulley 53 which is attached to the yoke 12 of the fore-arm 8 at the elbow axis 13. The pulley 53 can advantageously be divided into two parallel pulleys so as to limit the forces applied in the direction of the movement imposed. Similarly, the second pulley 50 is associated with a control cable 54 which is returned by a pulley 55 carried by the arm 15 onto a double pulley 56 which is fixed on the supporting block 21 at the axis 20. The pulleys 53 and 56 have diameters which are identical with those of the pulleys 49 and 50, with the result that the movement of the sleeve 43 which is produced by the motor 41 can be transmitted to an equal extent but in opposite directions on the one hand towards the fore-arm 8 and on other hand towards the supporting block 21, this being achieved by virtue of a suitable arrangement of the cables 51 and 54.

Finally, the third movement of the manipulator is carried out about the axis 34 of the body 40 with respect to the support column 35 by means of a third motor 57 which drives the body in rotation about said axis. Said body is guided within a stationary bearing 58 carried by said column and is accompanied in its movement by the articulated assembly which is formed by the arm 15, the fore-arm 8 and the tong unit 1.

Figure 3:
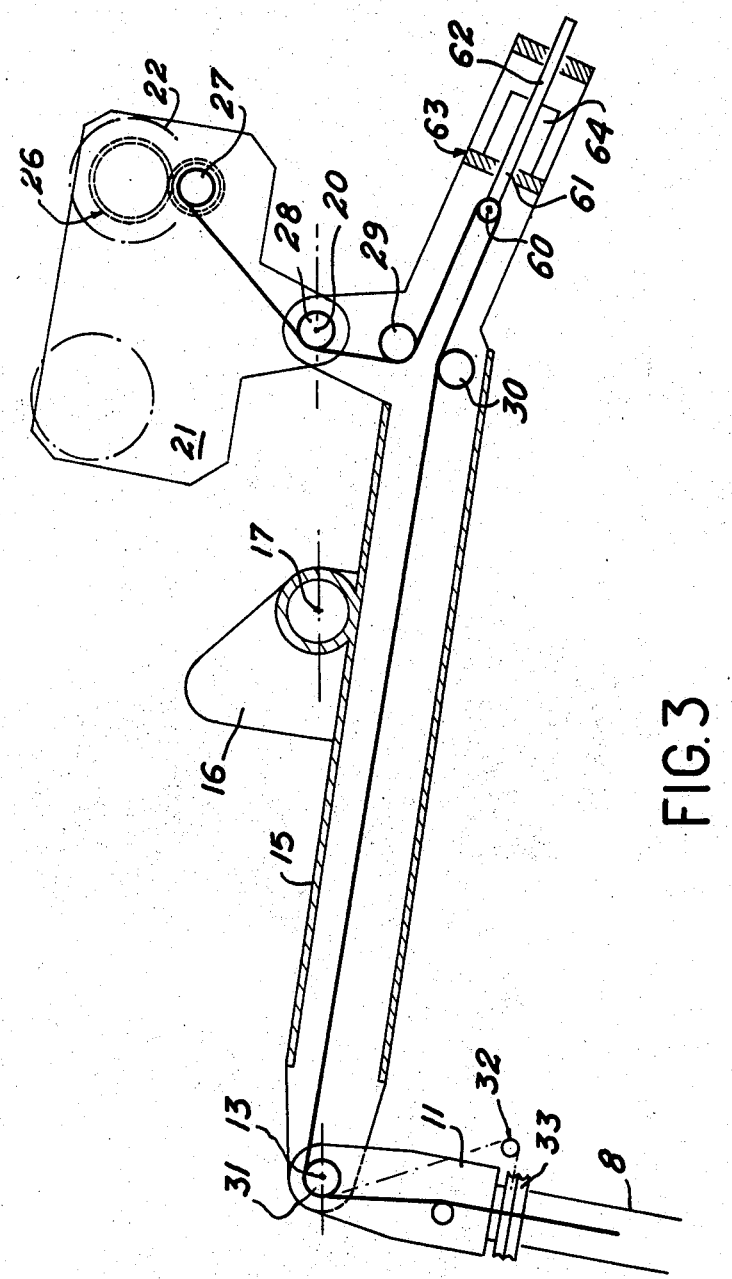
FIG. 3 is a diagrammatic view illustrating in the alternative construction shown in FIG. 1 the means for carrying out the parallel movements having the same amplitude and in opposite directions of the fore-arm on the one hand and of the supporting block on the other hand about parallel pins mounted at the extremities of the arm.

FIG. 3 illustrates a detail arrangement which is advantageously employed in the manipulator according to FIGS. 1 and 2 described above, in which the elements for transmission of the movements initiated by the motors 22 to 25 of the supporting block 21 are associated with stress detectors which serve to measure the torques arising from the couples exerted at the time of these movements. To this end, the extremity of the arm 15 is provided in the case of each transmission element, that is to say for each movement considered separately, with the two aforementioned pulleys 29 and 30 which enable said element (cable, belt or chain) to form a loop 59 which is joined at the mid-point thereof to a pulley-block 60, the supporting yoke 61 of which is connected to a tension detector 62 fixed within a support 63 provided at the extremity of the arm 15 beyond the yoke 18 which carries the block 21.

When parallel movements are carried out in opposite directions on the one hand by the fore-arm 8 and on the other hand by the supporting block 21 and have the effect, for example, of winding a given length of the transmission element round the pulley 31 of the elbow pin 13 while at the same time unwinding the same length from the pulley 28 of the pin 20, the pulleys 28 and 31 being so designed as to have the same diameter, the tension applied to the two oppositely acting lengths of said element is accordingly not modified by these movements. This tension, which can be adjusted by means of a nut 64 carried by the support 63 and which produces action on the yoke 61 of the pulley-block 60 is measured by the associated detector 62. In particular when a torque is exerted by one of the motors 22 to 25, the corresponding detector measures the difference in tensions applied to the two lengths of the transmission element. This difference can readily be processed by the control loop which remotely connects the motors of the manipulator considered to another manipulator or to a control station served by an operator who is making use of the manipulator. It should also be noted that the reduction-gear units such as the unit 26 which are each associated with motors 22 to 25 can advantageously be chosen so as to divide the rotation of said motors with respect to the pulleys 28, 29, 30 and 31 which are driven from these latter by means of the transmission elements in a ratio within the range of 5 to 10 corresponding to the necessary torque as well as to the other conditions of friction and inertia which are established by the control loop. It should finally be noted that these different motors are preferably provided with brakes in order that the corresponding unitary movements may be stopped at each instant.

The advantages of the manipulator as thus described can readily be deduced from the foregoing; in the first place, the relative lateral displacement of the shoulder axis 17 with respect to the arm 15 as well as the relative lateral displacement of the pivotal axis 20 of the supporting block 21 provide a sufficient clearance for the angular movements of said block which correspond to those of the fore-arm 8 and can vary from the position of alignment of this latter with the arm to a withdrawn position in which said arm makes an angle of about 30° with said fore-arm. It should be noted that the movement of the arm 15 about its shoulder axis 17 is added to this movement if consideration is given to the rotation of the drive pulley 53 which is fixed on the elbow pin and if the motor 41 is maintained stationary. Moreover, a further advantage of the relative displacement of the shoulder axis arises from the fact that the motor 36 which controls the movement about said axis can thus be fixed directly on the stirrup 16.

Another advantage of the manipulator under consideration lies in the fact that, in the movements produced on the one hand by the motor 36 about the shoulder axis 17 and on the other hand by the motor 41 for the movements about the elbow axis 13, torques of substantially equal value are applied. In fact, in the case of any given shoulder movement in which the fore-arm 8 remains vertical and parallel to itself, a load carried by the tong unit exerts on the motor 36 a torque at the shoulder which is proportional to the distance between the elbow axis 13 and the shoulder axis 17. Similarly, when the shoulder remains stationary, any elbow movement exerts on the motor 41 by means of the pulleys 49 and 50 an independent torque which is added to the previous torque about the shoulder axis. On the other hand, the torque exerted on the pulley 53 which is located on the elbow axis 13 is applied about the shoulder axis 17 by means of the two lengths of the cable 51. The result thereby achieved is that, in order to lift the arm with an angle of the elbow with respect to said arm which remains of fixed value, the two motors 36 and 41 cooperate; in consequence, if the levers constituted by the fore-arm 8 and the arm 15 are equal, the applied torques are also made equal. The equality of said torques, which makes it possible in particular to employ motors and reduction-gear units having the same characteristics, constitutes a useful property for the design and operation of the control loop which is associated with the manipulator.

If the permanent balancing of the arm, fore-arm and tong unit about the shoulder axis is also carried out by virtue of the arrangements of the invention in which the supporting block 21 of the motors 22 to 25 is continuously readjusted with respect to the fore-arm, a further balancing operation is necessary for the above-mentioned articulated assembly about the axis 34 of the body 40 which is laterally displaced with respect to the arm 15. Any device of a type known per se could readily be adopted, especially an arrangement which makes use of springs or counter-weights suitably disposed on the body 40 itself with respect to the bearing 58 about which said body is capable of rotating. However, it should be noted that if the axis 34 were disposed vertically instead of being horizontal as in the figure, it would no longer be necessary to effect any balancing.

Figure 4:
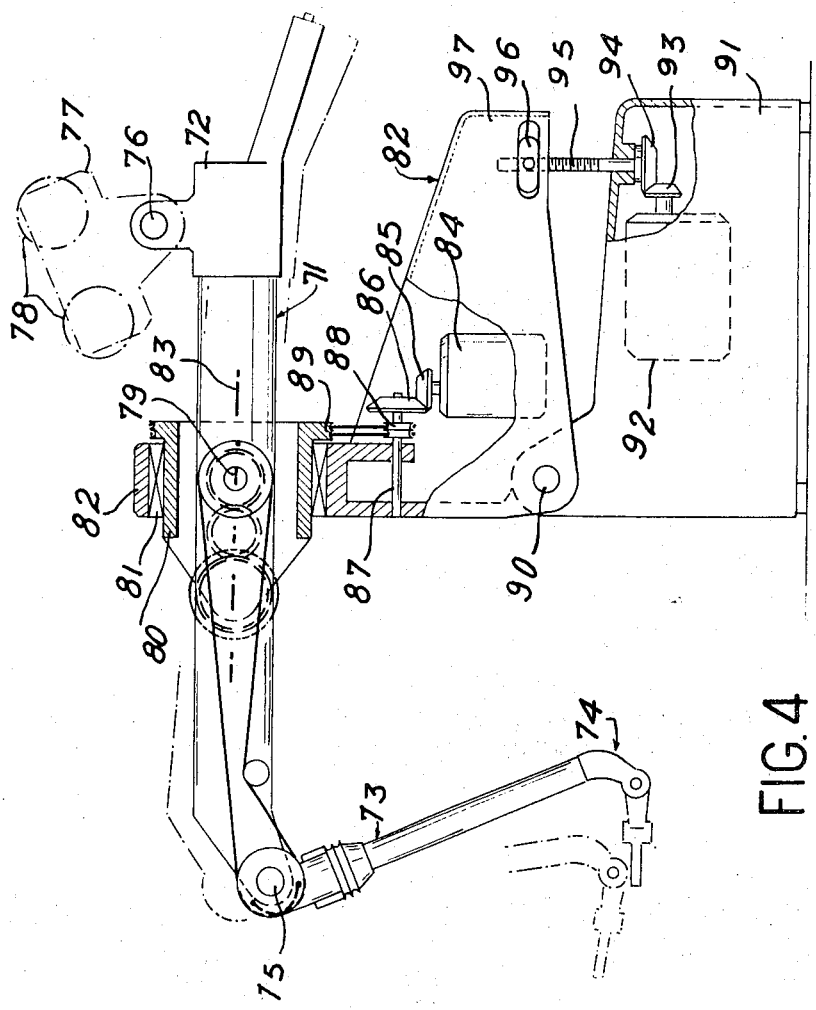
FIG. 4 is a diagrammatic view in elevation showing another alternative embodiment of the manipulator which illustrates the means employed for controlling the rotation of the complete manipulator about an axis which intersects the shoulder-pin axis and is located at right angles thereto.

In FIG. 4, there is shown in vertical cross-section another alternative embodiment of the manipulator under consideration as generally designated by the reference numeral 71 and comprising in the same manner as the form of construction shown in FIGS. 1 to 3 an arm 72, a fore-arm 73 and a manipulation tong unit 74 which is pivotally mounted at the end of said fore-arm. At one extremity of the arm 72, the fore-arm 73 is pivoted about a so-called elbow pin 75 whereas, at the other extremity, the same arm 72 carries on a pivot-pin 76 which is parallel to the elbow pin a supporting block 77 for drive motors such as the motors 78, only two of which are shown in the figure. Provision is made for four motors which serve to transmit to the fore-arm 73 and to the tong unit 74 independent movements for carrying out respectively the movement of rotation of the fore-arm 73 about its own axis in an azimuthal plane, a movement of elevation, a movement of rotation and finally a movement of closure of the jaws of the tong unit. As in the previous embodiment, the supporting block 77 is so arranged as to provide continuous balancing of the fore-arm 73 and the tong unit 74 about the shoulder axis 79 about which the manipulator arm 72 pivots, especially when the tong unit is not carrying any object.

In the example now under consideration, supporting of the arm and of the elements associated therewith is carried out in such a manner as to enable the manipulator as a whole to perform a rocking movement or movement of transverse rotation about an axis at right angles to the shoulder axis without setting up a restoring torque about said axis. To this end, provision is made for a cylindrical sleeve 80, the arm 72 being mounted within said sleeve with a substantial clearance and permitted to move about its shoulder axis 79. The cylindrical sleeve 80 is in turn rotatably mounted on roller-bearings 81 internally of a support 82 and the axis 83 of said sleeve intersects the shoulder axis 89 at a point which is the center of gravity of the assembly consisting of arm, fore-arm and supporting block.

In order to carry out the movement of rotation of the complete manipulator about said axis 83, use is advantageously made of a reduction-gear motor 84 which is rigidly fixed to the support 82 and the output shaft of which is fitted with a bevel pinion 85 disposed in meshing engagement with a return pinion 86, the shaft 87 of which supports a pulley 88 having preferably a double groove, said pulley 88 being intended to guide and to drive a transmission element such as a cable, a belt or a chain in the direction of a second pulley 89 which is integral with the external surface of the cylindrical sleeve 80 and located in a plane at right angles to the axis of rotation 83. In accordance with another preferred arrangement which is made in a wholly conventional manner, the pulley 89 is driven by the pulley 88 by means of belts or cables by disposing these latter in a double loop comprising a driving length and an oppositely acting driven length, said two lengths being mounted within the two parallel grooves of the pulleys 88 and 89.

In order that it should be possible to give a variable and not necessarily horizontal orientation to the axis 83 about which rotates the manipulator as a whole, and especially in order to incline the axis of the cylindrical sleeve 80 to a greater or lesser extent, provision can also be made to mount the support 81 by pivoting this latter about a pin 90 on a stationary casing 91, said casing being rigidly fixed to another reduction-gear motor set 92 which drives a threaded axial rod or worm 95 by means of a pinion 93 which is in turn disposed in meshing relation with a pinion 94, said worm being adapted to cooperate with a nut 96 which is held in position with respect to an extension 97 of the support 92. By virtue of this arrangement, the reduction-gear motor 92 which drives the worm 95 causes a limited pivotal motion of the support 82 about the pin 90 and an adjustment of orientation of the axis 83. The advantage of this additional arrangement will be brought out more clearly in the following description.

Figure 5:
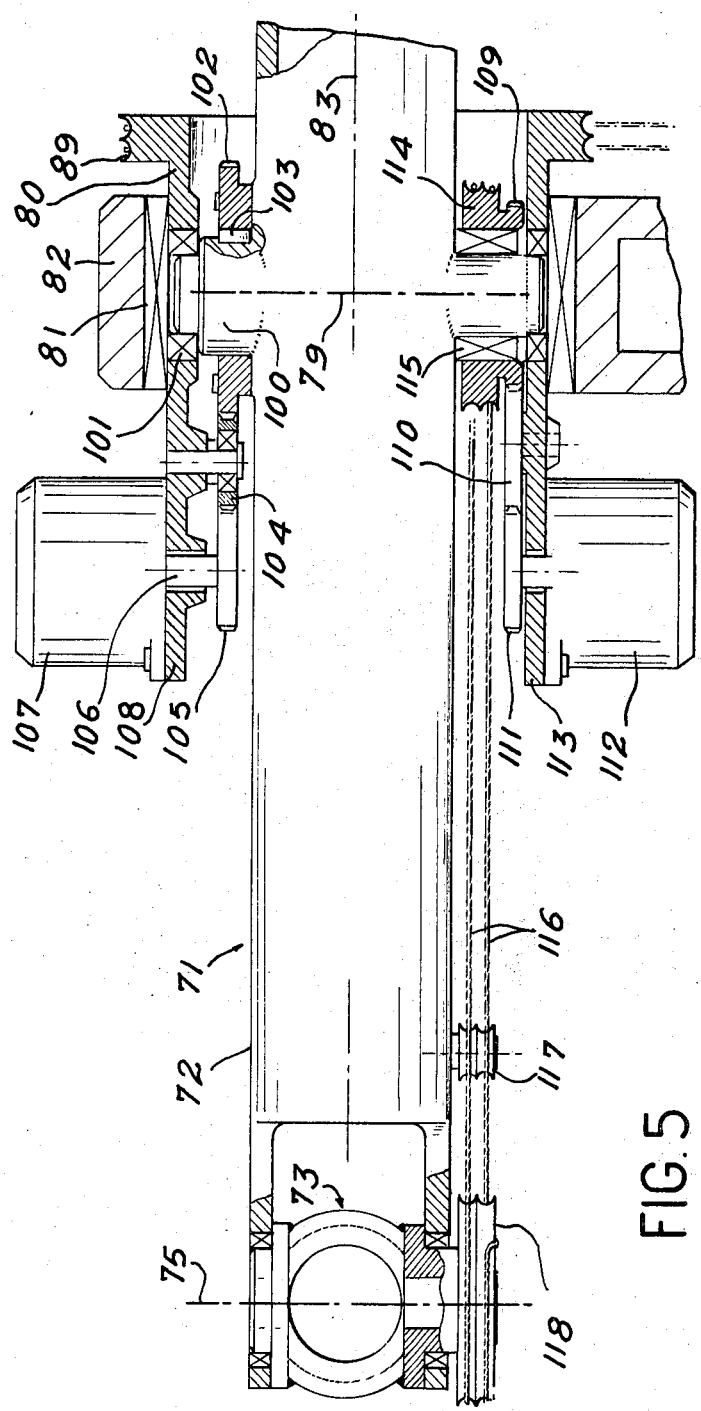
FIG. 5 is a sectional view of FIG. 4 taken along a plane passing through the axis of the arm which is placed in a horizontal position and illustrates the two other reduction-gear drive motors employed for carrying out the movements of the arm about the shoulder pin and of the fore-arm about the elbow pin.

In FIG. 5, which is a transverse sectional view of the manipulator of FIG. 4 along a plane passing through the axis 83 which is assumed to be horizontal, there are again shown the essential components which were contemplated earlier together with, in particular, the cylindrical sleeve 80 which is mounted for rotation about the axis 83 on its roller-bearings 81 within the support 82. In this figure, the shoulder axis 79 of the arm 72 coincides with the axis of a transverse shaft 100 which carries the arm 72 and the ends of which are rotatably mounted in bearings such as 101 provided in the internal surface of the sleeve 80. There is also fixed on said shaft 100 a driving pinion 102 which is maintained in position with respect to the arm 72 by means of a key 103. Through the intermediary of a second pinion 104 carried by the internal surface of the sleeve 80, said pinion 102 is engaged with a third pinion 105 fixed at the end 106 of the output shaft of a reduction-gear motor 107 which is in turn carried by an extension 108 of the sleeve 80. Said reduction-gear motor 107 thus produces by means of the pinions 105, 104 and 102 the controlled rotation of the arm 72 about the shoulder axis 79 within the interior of the sleeve 80 while nevertheless providing the possibility of limited but sufficient pivotal motion resulting from the longitudinal development of the sleeve and from the value of the clearance between said sleeve and the arm which passes through this latter.

On the opposite extremity of the shaft 100, there is mounted another pinion 109 which is freely rotatable on said shaft and is in turn engaged through an intermediate pinion 110 with a drive pinion 111 and this latter is driven by a second reduction-gear motor 112 which is in turn fixed on an extension 113 of the sleeve 80, said extension being substantially parallel and opposite to the extension 108 which carries the first reduction-gear motor 107. The free pinion 109 is rigidly fixed to a pulley 114 which is mounted to rotate freely about the shaft 100 on a bearing 115. By means of a transmission element such as a belt, chain or cable 116 which passes over guide pulleys 117, the pulley 114 aforesaid serves to return the movement imposed by the pinion 109 towards a drive pulley 118 which is fixed on the fore-arm 73 of the manipulator to rotate about the elbow axis 75. By virtue of these arrangements, the reduction-gear motor 112 drives the pinion 109 by means of the pinions 111 and 110 ; said pinion 109 in turn drives by means of the transmission element 116 the pulley 118 which produces the pivotal movement of the fore-arm about the elbow axis 75 independently of the other movements produced by the reduction-gear motors 107, 92 or 84.

The alternative embodiment as hereinabove described introduces a significant improvement since the manipulator assembly, that is to say on the one hand the arm, fore-arm and tong unit and on the other hand the block which supports the motors, is mounted to rotate about an axis which continuously intersects the shoulder axis and which, in consequence, in the case of movements under no load or in other words when the tong unit is not carrying any object, nullifies the torque which exists when the same axis is displaced laterally with respect to the arm. However, it should be noted that if, as has already been mentioned, the presence of the support sleeve necessarily introduces a limitation in the possibilities of angular displacement of the arm about the shoulder axis, this limitation is in fact favorable to the operation of the assembly as a whole insofar as the inertia to be overcome is reduced.

Figure 6:
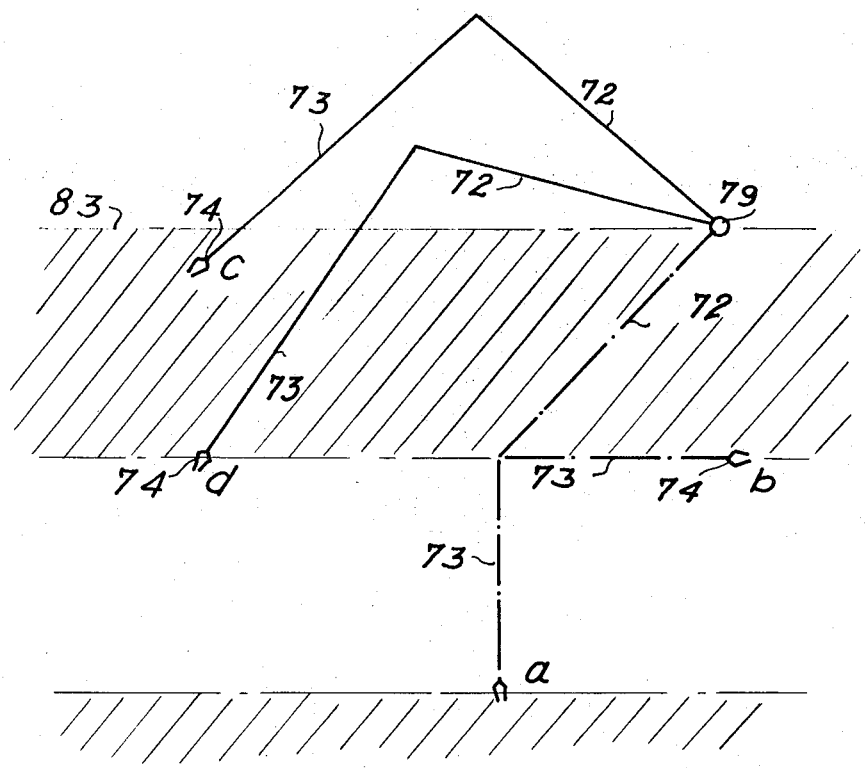
FIG. 6 is a schematic diagram which illustrates in the alternative form shown in FIG. 4 the relative positions of the arm and of the fore-arm and serves to define the limits of the angular displacements which are necessary in order to ensure acceptable inertia.

FIG. 6 demonstrates the action produced by a movement of angular displacement on the effort which may be exerted laterally on the tong unit in respect of a given value of torque, which causes a transverse movement of rotation of the arm assembly about the horizontally disposed axis 83, the arm and the fore-arm being represented in the drawing in the vertical plane which passes through said axis.

In a position of the arm 72 which is downwardly inclined, for example at an angle of 45° from the axis 73, the figure illustrates the fore-arm 73 in two positions also at 45° on each side of the position corresponding to perpendicularity of the arm and the fore-arm. The tong unit 74 which is pivotally mounted at the end of the fore-arm corresponds to the positions shown diagrammatically at $a$ and $b$. At $a$, the fore-arm 73 is vertical, the distance to the axis 13 being of maximum value. This distance accordingly establishes the value of the maximum torque of the movement of rotation of the assembly about the above-mentioned axis in respect of a given nominal force. In position $b$, the distance from the tong unit to the axis is appreciably shorter, with the result that the same torque exerted entails the need for a higher force in the ratio of the distances to the axis 83 in positions $a$ and $b$ mentioned above. Similarly, the inertia which is due to the drive motor and is proportional to the square of the effort exerted is in an even higher ratio. Thus, if the ratio of distances is 1.2, the force will be double and the inertia will be quadruple. In consequence, the inertia becomes progressively higher as the distance to the axis 13 decreases as, for example, when the tong unit 4 takes up position c.

In order to overcome this drawback, it is therefore an advantage to limit the angular displacement of the arm 72 above the axis 73 to a value of the order of 15° in particular. Thus, in the case of an angular displacement of the fore-arm between ±45° on each side of the mean position at right angles to the arm, there is established a suitable field of action with acceptable values of inertia within this latter. The point d represents the end position of the tong unit to which corresponds an inertia similar to that noted in position b. This range in which the maximum force varies approximately by a factor of one to two and the inertia consequently varies by a factor of one to four is particularly useful in the design of a bilateral manipulator control system. In the drawing, the shaded zones illustrate the forbidden regions for the tong unit, thereby limiting the overall inertia to a value which is always acceptable. It remains understood that recourse can readily be had to the additional arrangements illustrated in FIG. 1, in which the cylindrical sleeve support is itself mounted for rotation aboutt a pivot-pin on a stationary frame, thereby permitting the possibility of inclining the position of the sleeve axis about which the complete assembly rotates, this inclination being such as to direct the arm towards the desired work zone while limiting the overall inertia to be overcome in the transverse movement.

Figure 7:
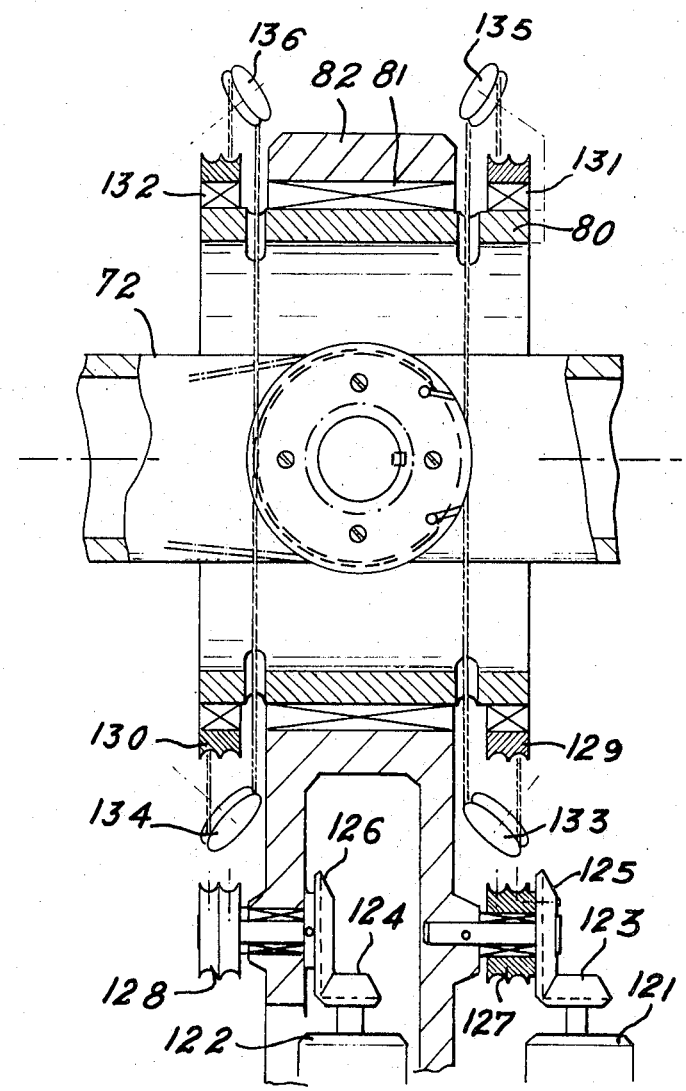
FIGS. 7 and 8 are two sectional views taken along two planes respectively at right angles and showing a mechanical differential drive system arranged on the arm and the arm support and designed to produce by means of two reduction-gear motors carried by said support the movement of rotation of the complete manipulator and the movement of the arm about the shoulder pin.
Figure 8:
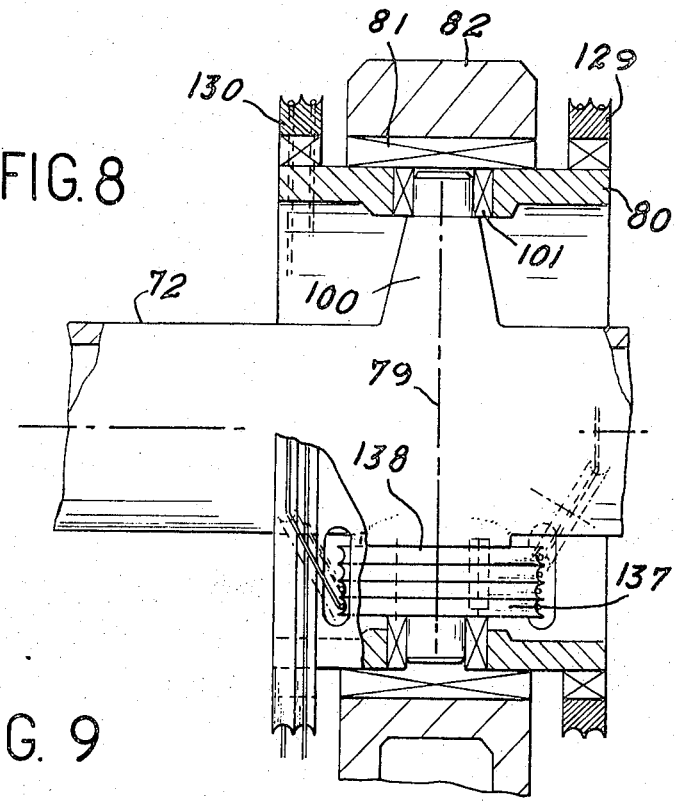

FIGS. 7 and 8 illustrate another alternative form of construction which arises from the embodiment hereinabove described and in which a mechanical differential system is employed for initiating either the movement of rotation of the complete manipulator about the axis of the cylindrical sleeve or the pivotal movement of the arm about the shoulder axis. This differential system comprises in particular two identical reduction-gear motors 121 and 122 which are controlled in synchronism and capable of rotating either in the same direction or in opposite directions. The output shafts of said reduction-gear motors comprise bevel drive pinions 123 and 124 disposed in meshing engagement with two countershaft angle-pinions 125 and 126 coupled respectively to two pulleys 127 and 128, the shafts of which are preferably located in the line of extension of each other on the support 82. There is associated with each of the pulleys referred-to above or driving pulleys a guide pulley of large diameter, designated respectively by the references 129 and 130 and mounted to rotate freely on the external surface of the cylindrical sleeve 80 on a roller-bearing designated respectively by the references 131 and 132. Said pulleys 129 and 130 are themselves associated with twice two return pulleys 133 and 134 on the one hand, 135 and 136 on the other hand, which are loosely mounted and carried by yokes rigidly fixed to the sleeve 80, and finally with a driven pulley 137 or 138, said pulleys 137 and 138 being of the same diameter and mounted in such manner as to be keyed around the shaft 100, the axis 79 of which constitutes the shoulder axis of the arm 72 (as shown in FIG. 8).

Figure 9:
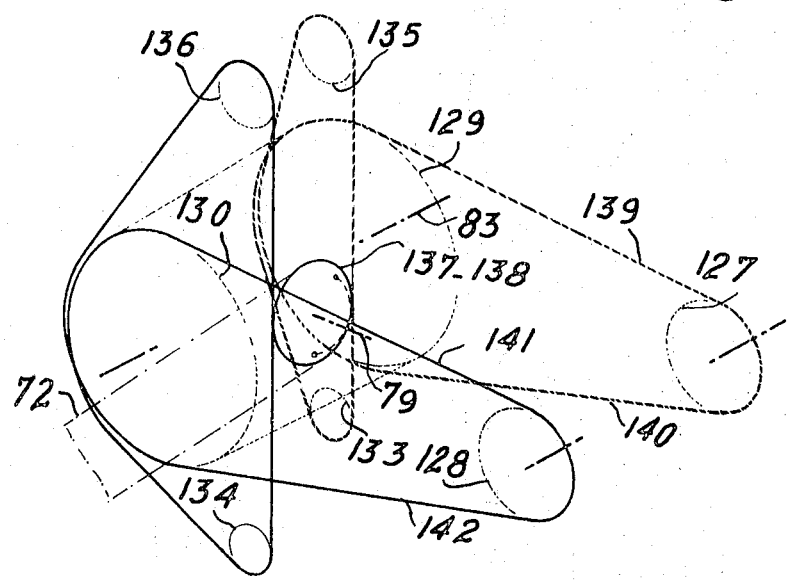
FIG. 9 illustrates in perspective the arrangement of a transmission element of the type consisting of a cable, belt or chain in the differential drive system shown in FIGS. 7 and 8 and serves to explain the operation of said element.

The diagram of FIG. 9 provides a clear illustration which accordingly explains the operation of the cable-type mechanical differential system which is thus obtained and equivalent to the conventional differential system of the bevel pinion type. In this figure, in which the different pulleys actually employed are alone illustrated for the sake of enhanced simplicity, there are again shown in particular the driving pulleys 127 and 128 which are actuated respectively by the reduction-gear motors 121 and 122. There is associated with the pulley 127 a driving and transmission element of the type consisting of a cable, belt or chain, one length 139 of which is first wound around the pulley 129, then around the return pulley 133 so as to come back tangentially onto the driven pulley 137, the axis of which coincides with the shoulder axis 79 of the arm 72. Similarly, the oppositely acting length 140 of the same driving element is first wound within a parallel groove of the pulley 129, then passes over the pulley 135 and is returned tangentially to the driven pulley 137. So far as the second driving pulley 128 is concerned, this latter is similarly associated with a driving and transmission element, the lengths 141 and 142 of which pass over the guide pulleys 130, 134 and 136, then over the driven pulley 138 which is rigidly fixed to the pulley 137.

By virtue of these arrangements, it is readily apparent that, in the case of a controlled rotation of the driving pulleys 127 and 128 in the same direction, parallel forces are applied in the same direction on the lengths 139 and 141, these forces which are returned on the one hand by the pulleys 129 and 133 and on the other hand by the pulleys 130 and 134 being converted on the coupled driven pulleys 137 and 138 into oppositely acting forces. Under these conditions, said lengths which cannot be either wound on or unwound from said pulleys cause the rotation of the complete manipulator about the axis 83, that is to say about the axis of the cylindrical sleeve 80. On the other hand, if the driving pulleys 127 and 128 are actuated in such a manner as to cause them to rotate in the opposite direction, it is apparent that the forces applied to the lengths 139 and 141 are always parallel but in opposite directions, thereby causing the rotation of the driven pulleys 137 and 138 in the same direction under the motion-transmitting action of intermediate pulleys and producing a movement of rotation of the arm 72 about the shoulder axis 79 whilst the cylindrical sleeve 70 remains stationary. By suitably calculating the values of the diameter on the one hand of the driving pulleys 127 and 128 and, on the other hand, of the transmission pulleys 129 and 130 which are mounted around the cylindrical sleeve 80, it is an easy matter to restore to a suitable value the torque which is necessary for the lateral rotation of the complete manipulator compared with the shoulder torque. It is accordingly apparent that, by virtue of this arrangement, the values of inertia forces to be overcome for the execution of these movements are restored to one-half the value of the previous arrangement.

In the alternative embodiment which has just been described, it is clearly necessary to make use of a third reduction-gear motor which is not illustrated in the figures in order to cause the movement of the fore-arm with respect to the arm about the elbow axis in precisely the same manner as described with reference to the example of FIGS. 4 and 5, this movement being continuously balanced by the oppositely directed angular displacements of the fore-arm and of the block which supports the drive motors. Finally, and in all the embodiments contemplated in the foregoing, torque detectors mounted at the junction between the output stage of the reduction-gear units and the motor-supporting block can be associated with each reduction-gear motor of the manipulator apart from the motors which are carried by said supporting block.

What we claim is :

1. A manipulator with drive motors comprising an arm pivotally mounted on a shoulder pin and provided at one end with a yoke for the pivotal attachment to an elbow pin parallel to said shoulder pin of a fore-arm which is capable of carrying out independently of its movement about the elbow pin a movement in azimuth corresponding to a rotation of said fore-arm about its own axis and a tong unit pivoted at the extremity of the fore-arm on a wrist pin located in a plane which is parallel to the elbow pin, said tong unit being capable of carrying out independently of its movement of elevation about its wrist pin a movement of rotation about its own axis and a movement of closure of its jaws, wherein said manipulator comprises a supporting block for drive motors and reduction-gear units, said block being pivoted about a pin in parallel relation to the shoulder-pin axis at that extremity of the arm which is remote from the elbow pin so as to produce by means of transmission elements such as cables guided by pulleys mounted on the pivot-pins of the shoulder, elbow and wrist the movements of rotation of the fore-arm about its own axis and the movements of elevation, of rotation and of closure of the tong unit, said supporting block which is rotated about its pin on the extremity of the arm with a movement in the opposite direction but having the same amplitude as the movement of the fore-arm about the elbow pin at the other extremity of said arm being so arranged as to ensure continuous balancing of the arm, fore-arm and tong unit about the shoulder pin.

2. A manipulator according to claim 1, wherein the movement of the arm about the shoulder pin is effected by a motor which is carried by the arm and the output shaft of which comprises a pinion disposed in meshing engagement with a ring-gear which is rigidly fixed to the body and coaxial with said shoulder pin.

3. A manipulator according to claim 1, wherein the movement of the fore-arm about the elbow pin and the parallel movement of the supporting block in the opposite direction and having the same amplitude are carried out by another motor which causes the rotation about the shoulder pin of at least one drive pulley on which is fixed a cable or chain passed over a pulley having the same diameter attached to the fore-arm at the elbow-pin axis and over another pulley also having the same diameter and attached to the supporting block at the axis of articulation of said block on the arm.

4. A manipulator according to claim 3, wherein the drive pulley is separated into two parallel pulleys for driving two cables which pass in one case over the pulley of the elbow pin and in the other case over the pulley of the supporting-block pin.

5. A manipulator according to claim 1, wherein the transmission elements of the type consisting of cables which are driven by the motors carried by the supporting block are associated with stress detectors mounted on an extension of the arm and adapted to check the torques transmitted during the different movements.

6. A manipulator according to claim 5, wherein the stress detectors measure in the case of each movement the difference between the forces exerted on two oppositely acting transmission elements which pass over the guide pulleys of the elbow pin and of the supporting-block pin.

7. A manipulator according to claim 1, wherein the shoulder pin is carried by a body mounted so as to be capable of moving about a horizontal axis which is adjacent to the arm and about which is performed the general movement of rotation of the arm, fore-arm and tong unit, the movement of rotation of the body about said horizontal axis being effected by a motor mounted on a column which supports said body.

8. A manipulator according to claim 1, wherein the axis of the shoulder pin is disposed along a diameter of a cylindrical sleeve mounted so as to be capable of rotating about its own axis within a support, the axis of the sleeve being perpendicular to the axis of the shoulder pin and in intersecting relation thereto.

9. A manipulator according to claim 8, wherein the cylindrical sleeve has a guide pulley externally coacting with a driving element such as a cable, said element being passed over a second pulley driven by a reduction-gear motor so as to initiate rotation of the sleeve and the complete manipulator about the axis of said sleeve within the support.

10. A manipulator according to claim 9, wherein the cylindrical sleeve is provided with extensions on which are mounted two additional reduction-gear drive motors, one motor being intended to drive a pinion attached to the arm and having an axis which coincides with the shoulder-pin axis and the other motor being intended to drive a second pinion mounted to rotate freely about the shoulder pin and attached to an idler pulley loosely mounted on said pin, one of said transmission elements being mounted between the idler pulley and a drive pulley fixed on the fore-arm and having an axis which coincides with the elbow-pin axis.

11. A manipulator according to claim 8, wherein the support of the cylindrical sleeve comprises two identical reduction-gear motors having control actions which are synchronized in the same direction or in opposite directions and transmit power separately to two driving pulleys, each driving pulley being associated with a guide pulley in co-axial relation with the sleeve and freely rotatable on said sleeve, then with two return pulleys freely mounted on pins carried by yokes which are fixed on said sleeve, and finally with a driven pulley attached to the arm and having an axis which coincides with the shoulder axis, the two driven pulleys corresponding to the two reduction-gear drive motors being identical and in coaxial and rigidly fixed relation.

12. A manipulator according to claim 8, wherein the support of the cylindrical sleeve is pivoted about an axis on a frame and associated with a position-control device which produces a variation in the orientation of the sleeve axis in a plane at right angles to the axis on which said support is pivotally mounted on said frame.

13. A manipulator according to claim 12, wherein the device for controlling the position of the support is a reduction-gear motor which is fixed on the frame and the output shaft of which drives a worm engaged with a nut carried by the support.

* * * * *